UNITED STATES PATENT OFFICE.

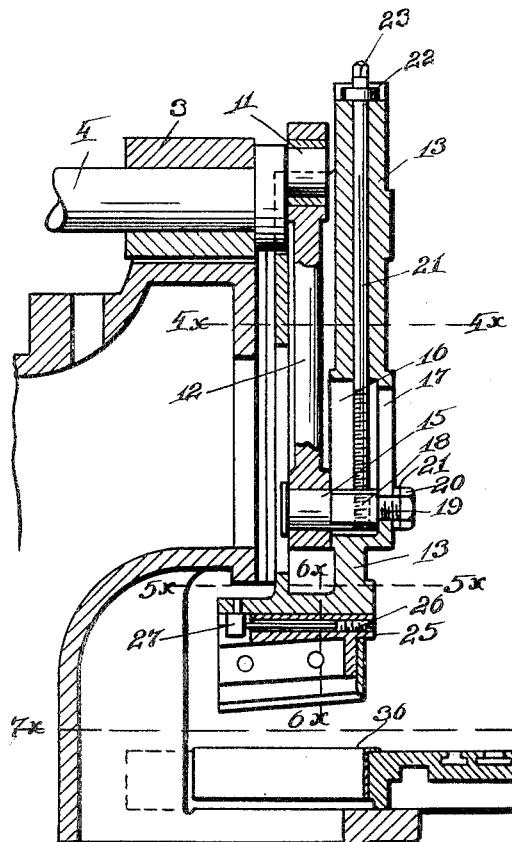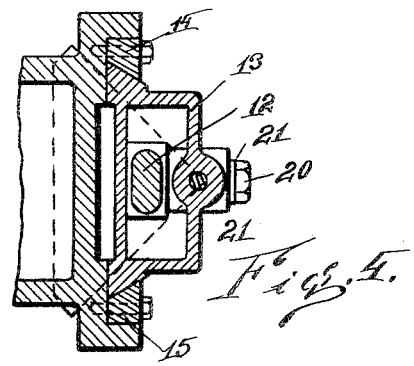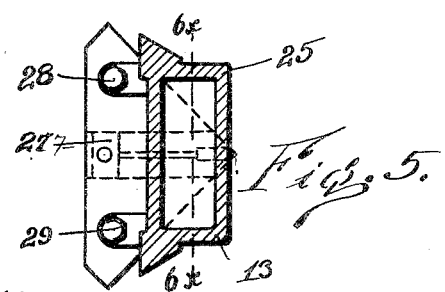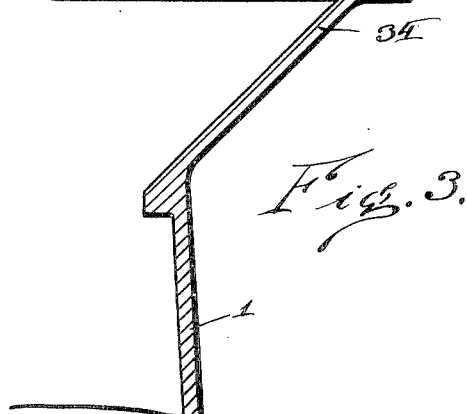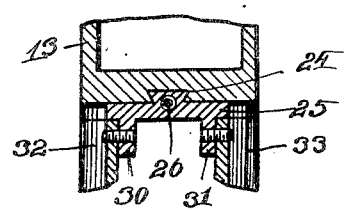

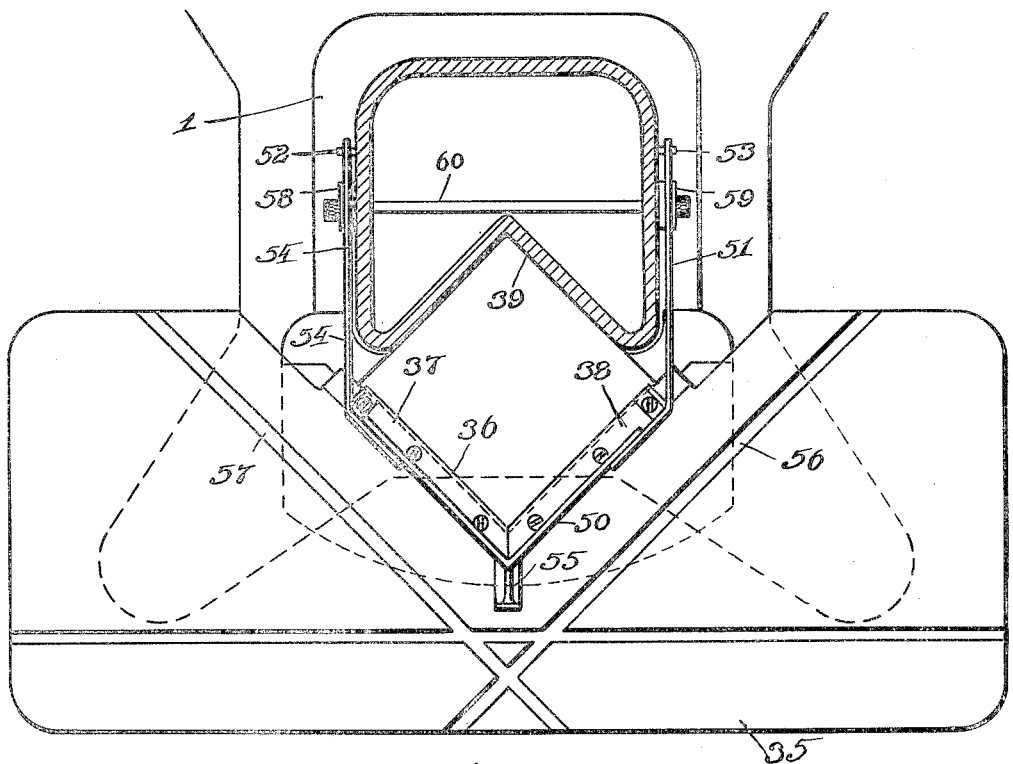

WILLIAM F. MORSE, OF ROCHESTER, NEW YORK, ASSIGNOR TO SAMUEL R. PARRY, OF ROCHESTER, NEW YORK.

CORNER-CUTTER.

1,351,116.　　　　Specification of Letters Patent.　　Patented Aug. 31, 1920.

Application filed October 10, 1917. Serial No. 195,830.

*To all whom it may concern:*

Be it known that I, WILLIAM F. MORSE, a citizen of the United States, residing at Rochester, in the county of Monroe and State of New York, have invented certain new and useful Improvements in Corner-Cutters, of which the following is a specification.

The object of this invention is to provide a new and improved corner cutter.

This and other objects of the invention will be fully illustrated in the drawing, described in the specification and pointed out in the claims at the end thereof.

In the drawings,

Fig. 3 is a vertical section on the line 3×—3× of Fig. 2.

Fig. 4 is a horizontal section on the line of 4×—4× of Fig. 3.

Fig. 5 is a horizontal section on the line 5×—5× of Fig. 3.

Fig. 6 is a vertical section on the line 6×—6× of Figs. 3 and 5.

Fig. 7 is a horizontal section on the line 7×—7× of Figs. 1 and 3.

In the drawings like reference numerals indicate like parts.

Figures 1, 2:
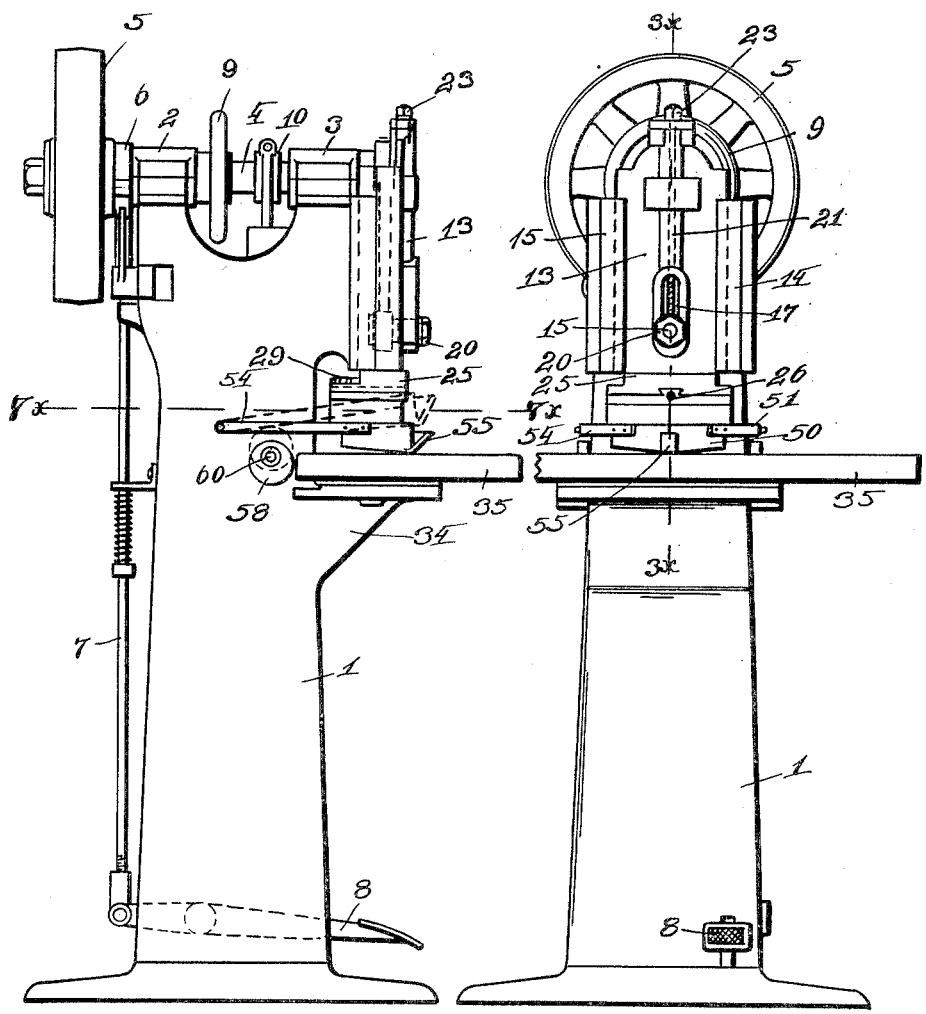
Figure 1 is a side elevation of my improved machine.
Fig. 2 is a front elevation of my improved machine.

In the drawings reference numeral 1 indicates the frame of the machine on the top of which two bearings 2 and 3 are formed in which bearings the shaft 4 rotates. On the rear end of this shaft is carried the pulley and fly wheel 5 by which the machine is driven. This pulley runs idly on the shaft and is connected thereto by a clutch 6 which is operated by a link 7 from the treadle 8. On the shaft 4 is provided a hand wheel 9 by which the shaft is turned in setting the press. The frame 1 is cut away at the top between the bearings 2 and 3 with a U shaped recess which provides clearance for the hand wheel etc. On this shaft is also provided a friction brake 10 which retards the rotation of the shaft and holds the clutch and shaft in firm positive engagement with the fly wheel so that during the whole rotation, the fly wheel and shaft will rotate together and the shaft will not at any point race ahead of the fly wheel as it might do for the interval between the closing of the clutch and the cutting of the stock.

On the end of the shaft 4 is carried the crank 11 to which is connected the connecting rod 12 by which the ram 13 is reciprocated. The ram 13 reciprocates in runways formed in the front of the press by the guides 14 and 15. The ram is fastened to the connecting rod by the wrist pin 15ᴬ. The ram is slotted at the back with a wide slot as indicated at 16 and a somewhat narrower slot 17 in front thereof. The wrist pin 15 is formed with flat faces as indicated at 18 which flat faces engage with the sides of the slot 16 and by which the wrist pin is held from turning therein. The wrist pin has at its front end a reduced cylindrical end 19 which extends through the slot 17 through the front of the ram. This reduced end is threaded and a nut 20 is screwed thereon by which the wrist pin is firmly clamped to the ram. A washer 21 is interposed between the nut and the ram. The wrist pin 15 has a vertical hole therethrough with which the shaft 21 makes threaded engagement. This shaft has a collar 22 near the top thereof which makes positive engagement with the ram. The shaft extends above the ram and is finished with a square head 23 by which it may be turned for the purpose of raising or lowering the ram with relation to the wrist pin.

The bottom of the ram extends rearwardly as shown in vertical section in Fig. 3. In the bottom of the ram is formed a dovetail slot as indicated at 24. In this slot slides a knife carrier 25 which is provided with a dovetail corresponding to the slot. In the knife carrier is provided a screw 26 which makes threaded engagement with the carrier. At its rear end this screw bears against the abutment or lug 27 so that by turning the screw the knife carrier is pushed forward. To facilitate the setting of the knife the ram is lowered until the knife is engaged with the die, after which the screw 26 is turned to draw the knife forward into proper engagement with the die. The knife carrier is fastened in place on the ram by the set screws 28 and 29 which pass through slots in the base of the ram and have a threaded engagement with the knife carrier.

The knife carrier is provided with two flanges 30 and 31 to which are bolted the cutting knives 32 and 33. These flanges and the knives which they carry are placed at an angle to each other and at their forward ends they come to a point and form a corner cutter as indicated in Fig. 5.

In the frame of the press is formed a hollow bracket 34 on top of which is carried the bed plate or table 35 on which is carried the cutting die 36 which consists of two cutting bars 37 and 38 which coöperate with the knives on the ram for the purpose of cutting corners from paper stock which stock can be put under the cutters either a sheet at a time or in large bunches of fifty or even more sheets. The edges of the cutting knives are inclined upwardly from back to front so as to make a shear cut. It will also be noticed that the connecting rod that operates the ram and cutters is located a little forward of the vertical center of the knives and the knives make contact with the stock, first at the back which will cause the knife at the front to swing slightly down and away from the front corner of the die, thus keeping the cutting knives in better shape and avoiding excessive wear that would be caused if they bore heavily against each other.

The frame of the press back of the cutting die is hollowed out V shaped as indicated at 39 in Fig. 7. This permits a box corner to be inserted under the knife up to the limit of the frame of the press permitting the stock to be cut accordingly and it also places the cutting knives in such an advantageous position with reference to the frame of the press above and below the knives so that the frame will spring but little or nothing even when making the heaviest of cuts and the weight of the frame can therefore be diminished. This result is secured largely by the reinforcing effect of the sides of the V-shaped recess, the sides of which come well forward as they spread out and connect the top and bottom of the frame together the more securely.

To safeguard the operator of the press, I provide a guard 50 which is shown in top plan view in Fig. 7 and in side and front elevation of Figs. 1 and 2.

This guard is angular in shape corresponding to the shape of the cutting knives and is carried by arms 51 and 54 which are pivoted on the studs 52 and 53. This guard normally rests on the table and covers the open space under and in front of the knife. It is provided at the front end with a cam 55 by which the guard is lifted by the stock when it is placed in position by the operator. The operator merely shoves the stock under the guard and the guard is lifted thereby without uncovering the knife to the operator and the stock can be moved rearwardly as far as desired against the gages or stops that may be provided in the slots 56 and 57 or against the V shaped frame 39 of the press and after the stock is in position the knives can then be operated to cut the stock. The guard can be removed from the press by simply springing the arms 51 and 54 out of engagement with the studs 52 and 53 or it can be lifted by the eccentrics 58 and 59 which operate on the arms to lift the guard and hold it in the dotted line position shown in Fig. 1. These eccentrics are carried on the shaft 60.

I claim—

1. In a machine for cutting box corners, the combination of a frame having a V-shaped recess extending rearwardly therein, the sides of said recess forming reinforcing members for said frame in the front thereof, a table in front of said recess and a cutter reciprocating above said table and between said table and said recess.

2. In a machine for cutting box corners, the combination of a frame, guides mounted thereon, a ram reciprocating on the said guides, a connecting rod having fixed centers for driving said ram extending above said guides, means at the side of the connecting rod for adjusting said ram vertically on said connecting rod, a knife carrier attached to the bottom of the ram and adjustable forward and backward thereon and knives carried on said knife carrier, and a die with which said knives coöperate.

3. In a machine for cutting box corners, the combination of a frame having a table thereon, a crank shaft in said frame above said table, a connecting rod connected to said shaft, a ram reciprocated by said connecting rod, and corner cutting knives carried on said frame, said connecting rod being connected to the ram forward of the center of the cutting knives.

4. In a machine for cutting box corners, the combination of a crank shaft, a ram, a connecting rod for driving said ram from said crank shaft, a stationary wrist pin on said connecting rod, said ram having a slot with which the wrist pin engages, and means for adjusting said ram on said wrist pin along the slot and clamping it in place thereon.

5. In a machine for cutting box corners, the combination of a table having shearing knives therein, a ram reciprocating above said table and having cutting knives thereon, a guard mounted to swing in front of said cutting knives and covering the interval between the cutting knives and table, and a cam on the front of said guard capable of being engaged by the stock whereby the guard is lifted by the stock inserted.

In testimony whereof I affix my signature.

WILLIAM F. MORSE.